United States Patent [19]

Jessup

[11] Patent Number: 4,641,543
[45] Date of Patent: Feb. 10, 1987

[54] INTERMEDIATE SHAFT THRUST BALANCE

[76] Inventor: Thurman W. Jessup, 130 Jeanine Way, Anaheim, Calif. 92806

[21] Appl. No.: 660,114

[22] Filed: Oct. 12, 1984

[51] Int. Cl.$^4$ .................... F16H 57/00; F16H 1/06; F16H 1/20
[52] U.S. Cl. ........................... 74/410; 74/414
[58] Field of Search ................. 74/410, 414

[56] References Cited

U.S. PATENT DOCUMENTS

| | | | |
|---|---|---|---|
| 2,982,146 | 5/1961 | Stoeckicht | 74/410 |
| 2,995,046 | 8/1961 | Mansachs | 74/410 |
| 3,011,365 | 12/1961 | Stoeckicht | 74/410 |
| 3,102,433 | 9/1963 | Stoeckicht | 74/410 |
| 3,245,279 | 4/1966 | Baker | 74/410 |
| 3,327,548 | 6/1967 | Welch | 74/410 |
| 3,338,109 | 8/1967 | Forsyth et al. | 74/410 |
| 4,187,735 | 2/1980 | Terry | 74/410 |
| 4,369,668 | 1/1983 | Pollak-Banda et al. | 74/410 |

OTHER PUBLICATIONS

Material Proposed to U.S.N. on 11/24/82, The Reverse Reduction Gear 46305 R 1081 is the design of the present applicant (6 sheets).
Guide to Propulsion Reduction, Bull. 3-10, Soc. Naval Architects, 4/61, p. 7.
U.S.N. DDG 51, Western Gear.
Gear-Wheel Co., Maag.
Marine Engineering Design, INST Marine Engineers, pp. 24, 25, 46, 47.
Progress & Development in Naval Propulsion, Weaving and Sampson, pp. 1, 8, 12.
G. E. Main Reduction Gears, p. 1-1.

*Primary Examiner*—Kenneth J. Dorner
*Assistant Examiner*—Michael D. Bednarek
*Attorney, Agent, or Firm*—Warren T. Jessup

[57] ABSTRACT

An intermediate shaft is provided with a single helical gear, and a double helical gear set having opposite and unequal helix angles. The double helical gear set meshes with a corresponding double helical gear set on a second shaft. A third shaft has a single helical gear meshing with the single helical gear of the intermediate shaft. The meshing of the double helical gear sets locks the intermediate shaft against axial motion. The axial thrust on the intermediate shaft, produced by the inequality between the helix angles of its double helical gear set, is offset by the helix angle of the single helical gear. This substantial equalizing of axial thrust obviates the need for a thrust bearing on the intermediate shaft.

4 Claims, 2 Drawing Figures

INTERMEDIATE SHAFT THRUST BALANCE

Gearing systems requiring large overall ratios usualy employ one or more intermediate gear shafts to transfer torque between the main shafts, i.e. a driving shaft and a driven shaft. To obviate the need for thrust bearings on the intermediate shaft, double helical gears are used to transmit the torque between the intermediate shaft and the main shafts with which it is meshed. Such gears lock the intermediate shaft axially to the mating gear, so that the position, and specifically the axial position of the two main shafts, determines the axial position of the intermediate shaft.

In practice it is virtually impossible, particularly with large gearing such as used in ship propulsion, to maintain precise axial positioning of the two main shafts. The intermediate shaft must therefore be made in two sections, coupled together by an axially flexible coupling.

Another form of gearing system obviates the necessity of a flexible coupling, so that the two sections of the intermediate shaft may be rigidly coupled: or if small enough for fabrication, may be made in one piece. In this form, single helical gears are used to couple the intermediate shaft to the respective main shafts. The single helical gear mesh allows the intermediate shaft to float in an axial direction, thus offsetting any small mis-positioning between the two main shafts. However, since the intermediate shaft is not locked to either of the main shafts, axially, thrust bearings on the intermediate shaft are required.

The helix angles on the single helical gears coupling the intermediate shaft to the respective main shafts are made of appropriate helical angulation, thereby minimizing the net axial thrust on the intermediate shaft. However, external operating conditions and limitations on manufacturing tolerance preclude complete elimination of net or residual thrust: so that thrust bearings are still required to hold the intermediate shaft in position.

The design of the present invention eliminates the need for thrust bearings on the intermediate shaft, without requiring an axially flexible coupling between the two sections of the intermediate shaft; or alternatively allowing the intermediate shaft, if small enough, to be made in one piece. As an alternative to a rigid coupling, it is sometimes desired to employ a quill or lay shaft which, while flexible in bending and torsion, is axially rigid. Such a shaft, without the axially flexible coupling, could not be used satisfactorily in the type of gearing system where double helical gears are used to transmit torque between the intermediate shaft and both of the main shafts. The present invention, however, is adaptable to the use of a one piece shaft, a fully rigid coupling, or an axially rigid quill or lay shaft type of coupling.

For purpose of specific illustration, the invention will be shown as applied to ship propulsion gearing, where the gearing reduces shaft speed, and where the intermediate shaft or shafts are so large that it is impractical to make them in one piece.

Two embodiments of the present invention are shown in the drawing.

Figure 1:
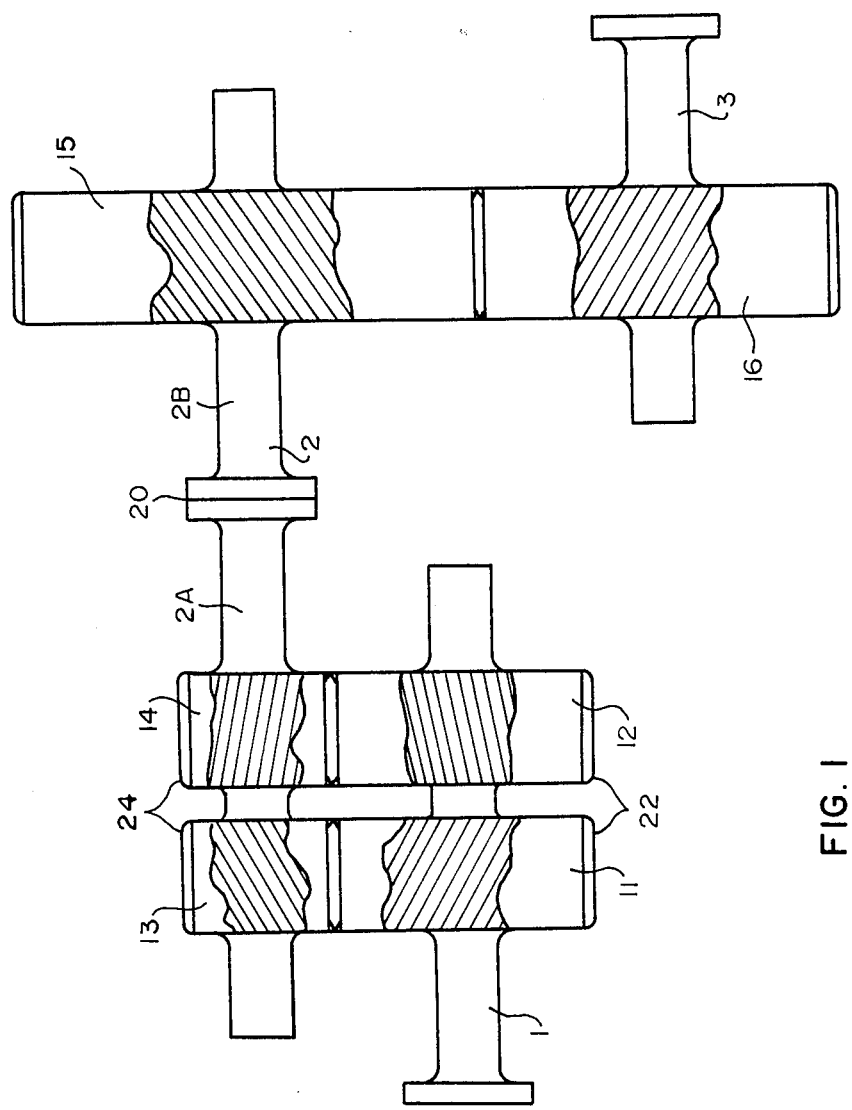
FIG. 1 shows a double reduction gear system, with one intermediate shaft.

In FIG. 1, 1 is a first shaft, gear coupled to a second shaft 2, which in turn is gear coupled to a third shaft 3. Shafts 1 and 3 constitute main shafts, gear coupled by shaft 2, which serves as an intermediate shaft. The third shaft 3 may be a driving shaft, torque from which is transmitted to the driven shaft 1 thru the intermediate shaft 2. Shaft 2 is shown as being fabricated in two sections, 2A and 2B, joined by a rigid coupling 20.

Driven shaft 1 has a double helical gear set 22, comprising a first gear 11 and a second gear 12. The helix angles of the gears 11 and 12 are opposite and unequal. The intermediate shaft 2 has a mating double helical gear set 24, comprising a third gear 13 which meshes with the first gear 11, and a fourth gear 14 which meshes with the second gear 12. Shaft 2 also has a single helical fifth gear 15, which meshes with a single helical sixth gear 16, on the driving shaft 3.

As seen in FIG. 1, the face widths of gears 13 and 14 are substantially equal. Thus, the tangential face loading on the gear 13 is substantially equal to the load on the gear 14. The inequality between the helix angles of the gears 13 and 14 produces an axial thrust on the intermediate shaft 2. The helix angle of the gear 15 (and the gear 16) is chosen such that the resulting axial thrust on the shaft 2 is opposite and substantially equal to that produced by the combination of gears 13 and 14.

Any small residual mis-positioning of the shaft 2 is easily corrected by the axial locking of the intermediate shaft 2 to the driven shaft 1, through the apex tracking action of the double helical gear sets 22 and 24. At the same time any small mis-positioning between the main shafts 1 and 3 is accomodated by the fact that gears 15 is free to slide back and forth with respect to gear 16, so that the coupling 20 between the shaft section 2A and 2B may be a rigid one. If desired the shaft 2 may be made in one piece.

In a shipboard installation the shaft 1 could be coupled to the propeller shaft; and the shaft 3 could be coupled to the main engine shaft. Thrust on shaft 1 could easily be absorbed within the propeller thrust bearing; and thrust on shaft 3 could easily be absorbed within the main engine thrust bearing or in a separate thrust bearing within the gear box. The gear teeth on gear 11 and 12 need not necessarily be equal in number, but the ratio of gear teeth 11 to 13, and of 12 to 14 must be equal.

Figure 2:
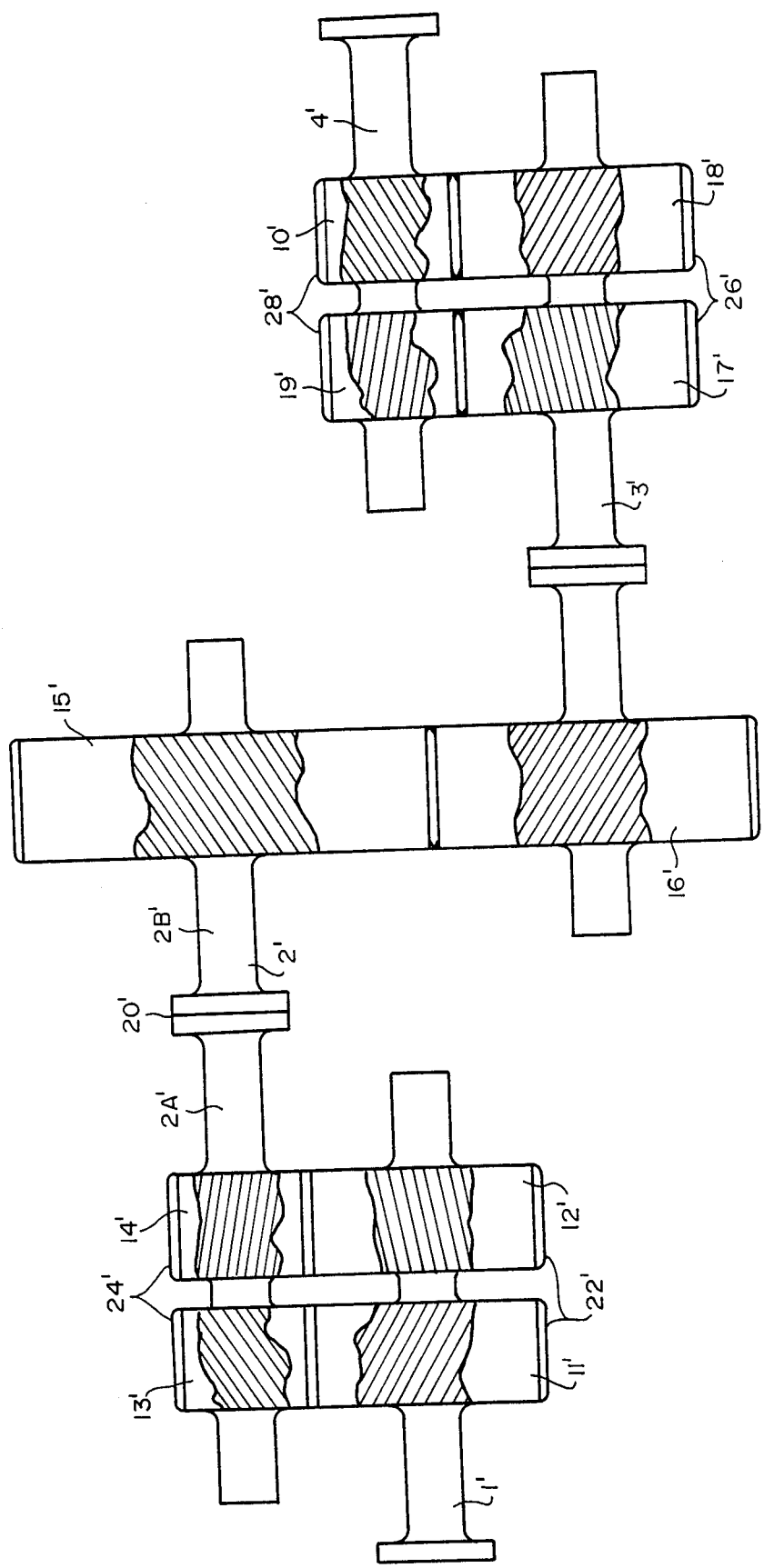
FIG. 2 shows a triple reduction gear system, with two intermediate shafts.

In FIG. 2, the invention is shown applied to a gearing system with two intermediate shafts. Here the shafts and gears have the same reference numerals as in FIG. 1, with a prime (') added. Additionally, a fourth shaft 4', has replaced shaft 3 as the driving shaft; shaft 3' thus becoming a second intermediate shaft. To this end shaft 3' is provided with a double helical gear set 26' comprising a seventh gear 17', and an eighth gear 18', which mesh with a gear set 28', comprising gears 19' amd 10', respectively, on shaft 4'.

Since the gears are properly loaded, the tangential face loading on gear 17' is substantially equal to the loading on gear 18'. The helix angles of gears 17' and 18' are opposite and unequal, this inequality producing an axial thrust on the intermediate shaft 3'. The helix angle of gear 16' (and gear 15') is so chosen that there results a counter thrust, opposite and substantially equal to that produced by the combination of gears 17' and 18'. This obviates the need for thrust bearings on shaft 3'. Any small residual axial mis-positioning on shaft 3' is easily corrected by the axial locking of shaft 3' to main shaft 4', through the apex tracking action of the double helical gear sets 26' and 28'.

What is claimed is:

1. Gearing system comprising:
   a first shaft having a double helical gear set comprising a first gear and a second gear, the helix angles of said first and second gears being opposite and unequal;
   a second shaft having: (1) a double helical gear set comprising a third gear meshing with said first gear, and a fourth gear meshing with said second gear; and (2) a single helical fifth gear;
   said third and fourth gears being of opposite and unequal helix angles and having substantially equal face widths, thereby resulting in substantially equal tangential face loading;
   a third shaft having a single helical sixth gear meshing with said fifth gear;
   said second shaft constituting an intermediate shaft between said first and third shafts;
   the inequality between the helix angles of said third and fourth gears, when the gears are substantially equally loaded, producing a first axial thrust on said second shaft;
   the helix angle of said fifth gear producing a second axial thrust on said second shaft opposite and substantially equal to said first axial thrust;
   the meshing of said double helical gear sets substantially locking said second shaft against axial motion relative to said first shaft;
   the substantial equalizing of said axial thrusts obviating the need for thrust bearings on said second shaft.

2. Gearing system in accordance with claim 1 comprising in addition:
   a fourth shaft; and wherein:
   said third shaft constitutes an intermediate shaft between said second shaft and said fourth shaft, and has a double helical gear set comprising a seventh gear and an eighth gear, the helix angles of said seventh and eighth gears being opposite and unequal;
   said seventh and eighth gears having substantially equal face widths, thereby resulting in substantially equal tangential face loading;
   said fourth shaft having a double helical gear set comprising a ninth gear meshing with said seventh gear, and a tenth gear meshing with said eighth gear;
   the inequality between the helix angles of said seventh and eighth gears, when the gears are substantially equally loaded, producing a third axial thrust on said third shaft;
   the helix angle of said sixth gear producing a fourth axial thrust on said third shaft opposite and substantially equal to said third axial thrust;
   the meshing of said two last named double helical gear sets substantially locking said third shaft against axial motion relative to said fourth shaft;
   the substantial equalizing of said second axial thrusts obviating the need for thrust bearings on said third shaft.

3. Gearing system in accordance with claim 1, wherein:
   said intermediate shaft comprises a plurality of sections coupled together by axially rigid coupling or shaft means.

4. Gearing system in accordance with claim 2 wherein:
   one or both of said intermediate shafts comprises a plurality of sections coupled together by respective axially rigid coupling or shaft means.

* * * * *